United States Patent [19]

Bostrom

[11] 4,137,796

[45] Feb. 6, 1979

[54] POWER OPENER WITH MANUAL OVERRIDE

[75] Inventor: Harry H. Bostrom, Chicago, Ill.

[73] Assignee: ECM Motor Company, Schaumburg, Ill.

[21] Appl. No.: 882,985

[22] Filed: Mar. 3, 1978

Related U.S. Application Data

[63] Continuation-in-part of Ser. No. 826,334, Aug. 22, 1977, abandoned.

[51] Int. Cl.[2] .............................................. F16H 33/00

[52] U.S. Cl. .................................... 74/625; 192/67 P; 192/95

[58] Field of Search ..................... 74/625; 49/139, 324, 49/342

[56] References Cited

U.S. PATENT DOCUMENTS

| | | | |
|---|---|---|---|
| 2,674,452 | 4/1954 | Hummert | 49/324 |
| 2,718,395 | 9/1955 | Ehrlich | 74/625 |
| 2,772,578 | 12/1956 | Kling | 74/625 |
| 3,452,479 | 1/1969 | Bentlel | 49/324 X |

*Primary Examiner*—Benjamin W. Wyche
*Assistant Examiner*—Wesley S. Ratliff, Jr
*Attorney, Agent, or Firm*—Dressler, Goldsmith, Clement, Gordon & Shore, Ltd.

[57] ABSTRACT

A mechanism which normally is driven by a motor, but which can be safely manually driven by a hand crank or the like in case of a power shortage or other emergency. The mechanism has a power-driven drive gear and a driven assembly which preferably includes a gear-like member, such as a worm, and a crank-receiving member, such as an internally splined hub. A disconnecting assembly which is responsive to engagement of the hand crank in the crank-receiving member is provided to disconnect the driven assembly from the power-driven drive gear.

24 Claims, 10 Drawing Figures

POWER OPENER WITH MANUAL OVERRIDE

CROSS-REFERENCES TO RELATED APPLICATIONS

This application is a continuation-in-part of application Ser. No. 826,334, filed Aug. 22, 1977, now abandoned.

BACKGROUND OF THE INVENTION

This invention relates to power-driven mechanisms, and more particularly, to a power-driven mechanism with a manual override for use in industrial window openers, automobile window openers, vehicle roof vent openers and the like.

Over the years a variety of different types of industrial window openers have been developed, which are remotely powered by an electric motor or other power source. These window openers are particularly useful in industrial plants, hospitals, institutions and other buildings having a large amount of windows and are designed to provide a convenient means for automatically, easily and readily opening a window.

In the event of power failure, however, it is imperative to be able to open the window manually, especially in emergency situations such as a fire. This task is sometimes very difficult because the motor is often directly connected to a gear train which opens the window and therefore requires substantial torque and manual effort to overcome the mass and static torque of the motor shaft to drive the gears. Not only is such work difficult, cumbersome and sometimes impossible, especially for many women and small children, but once accomplished, such counter-torque and forced rotation may cause permanent damage to the motor.

It is therefore desirable to provide a power opener having auxiliary safety features which overcome the preceding disadvantages.

SUMMARY OF THE INVENTION

A power opener or mechanism with manual override is provided which is particularly useful in a window opener or roof vent opener or the like, which can be manually driven in the event of a power shortage or other emergency without damaging the motor or other power source.

In accordance with principles of the present invention a power-driven drive gear is provided which is directly or indirectly driven and connected to a power source, such as an electric motor. A driven assembly, preferably including a gear-like driven member such as a worm, and a crank-receiving member such as an internally splined hub, is driven by the power-driven drive gear. In the illustrative embodiments, the worm is coaxially aligned and operatively associated with the hub and drives at least one lever having an engaging portion which partly defines a worm gear.

Desirably, a manual drive member, such as a hand crank having an externally splined driving head, is engageable with the crank-receiving member for manually driving the driven assembly. In order to prevent the hand crank from driving the drive gear and exerting undesirable external torque on the electric motor, which could damage or burn-out the electric motor, a disconnecting assembly is provided which is responsive to engagement of the hand crank in the crank-receiving member to disconnect the driven assembly from the drive gear.

In one form, the disconnecting assembly includes a coupling member, such as a locking pin, for releasably coupling the drive gear to the hub. Biasing means, such as a spring, is mounted within an internal chamber of the worm to urge the locking pin into locking engagement with the drive gear. The driving head of the hand crank is adapted to engage and disconnect the locking pin from the drive gear when the hand crank manually drives the hub to substantially prevent the hand crank from driving the drive gear.

The drive gear can be driven by a pinion which is directly or indirectly connected to a motor. Desirably, the drive gear is larger than the pinion and comprises a reduction gear having a greater number of gear teeth than the pinion so that the drive gear rotates substantially slower than the pinion.

In another embodiment, a driven gear, such as a reduction gear, is coaxially aligned with and fixed to the hub. The drive gear preferably is a pinion which is directly or indirectly connected to a motor. Desirably, the hub is integrally connected to the gear-like member or worm and includes an intermediate spring-carrying section and an elongated drive shaft which reciprocally slides within the internal chamber of the worm and drives the worm. The drive shaft preferably has a square cross-sectional configuration. The disconnecting assembly of this embodiment takes on the form of a coil spring which urges the driven gear into engagement with the drive gear. When the hub is being manually driven, the driving head of the hand crank will drive and move the driven reduction gear out of engagement with the drive gear to substantially prevent the drive gear from being driven by the hand crank.

In order to increase the mechanical advantage and leverage of the opening mechanism, a pair of levers can be provided for meshingly engaging and being driven by the worm.

In a further embodiment, the disconnecting assembly includes a coupling member which preferably takes the form of a spanner. Desirably, the spanner has an annular body and at least one, and preferably two, outwardly extending arms. A power-driven drive gear and a driven member, such as a worm, are both slotted for cooperatively receiving the arms. In the illustrative embodiment, biasing means, such as a spring, is mounted within an internal chamber of the worm to urge the spanner into locking engagement with the drive gear. A hand crank is specially constructed with a shoulder and driving head to drive and move the spanner out of engagement with the drive gear when it is desired to manually drive the driven member.

In one form the driving head of the hand crank has a cylindrical body portion with outwardly extending locking ears for mating interlocking engagement with the annular body of the spanner.

In another form, the hand crank has an externally splined driving head for meshing engagement with an internally splined wall of the spanner.

A more detailed explanation of the invention is provided in the following description and appended claims taken in conjunction with the accompanying drawings.

DETAILED DESCRIPTION OF THE ILLUSTRATIVE EMBODIMENTS

Figure 1:
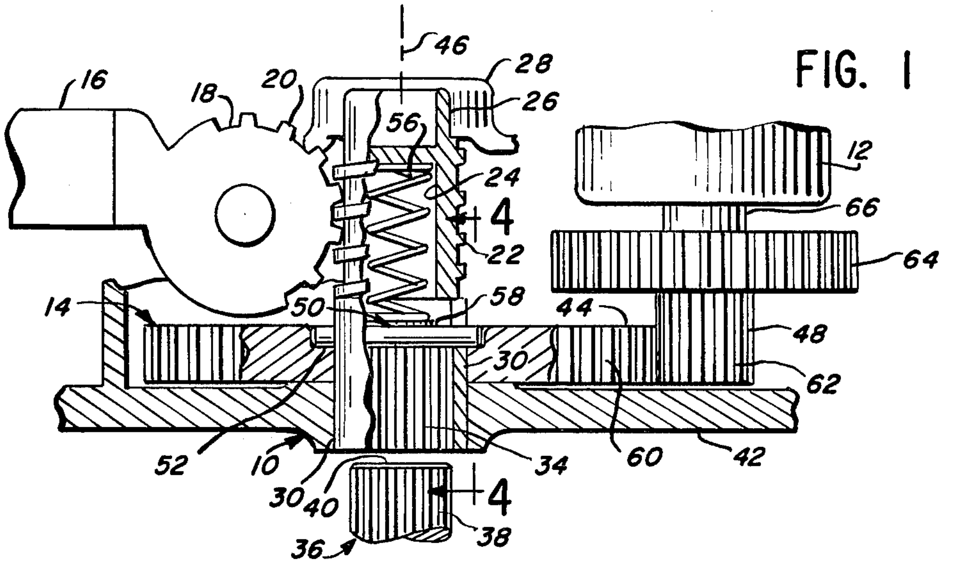
FIG. 1 is a fragmentary front view of an opening mechanism being driven by a motor for use in an industrial window opener in accordance with principles of the present invention and illustrating portions broken away for ease of understanding and clarity.

FIGS. 1–4 of the drawing illustrate a power opener, actuator or opening mechanism with manual override 10. The power opener 10 is mechanically power driven by a power source 12, such as an electrical motor or engine and is particularly useful in an industrial window opener, an automobile window opener, a vehicle roof vent opener and for opening other devices. Opener 10 has a gear train or clutch 14 which preferably defines a reduction gear assembly and includes a lever 16, such as a window-pivoting lever, which can for example be operatively connected to the movable frame of a window so that the window can be automatically and remotely opened and closed.

The window-pivoting lever can be constructed and arranged to move the window vertically, up and down, to open and close the window, or can be used to pivotally open a hinged window, such as a window which is hinged along one of its sides or along its top. In the illustrative embodiment the window-pivoting lever 16 is made of metal and has an engaging portion 18 which partly defines a worm gear 20, although in some situations it may be desirable that the lever 16 be operatively connected to a separate worm gear.

The worm gear 20 of the lever 16 is driven by a gear-like driven member 22 such as a worm. In some situations, however, it may be desirable that the gear train drive a member other than a gear-like member and be used in conjunction with other equipment other than industrial window openers.

In the illustrative embodiment the worm 22 has an internal cylindrical chamber or cavity 24 and a crown 26 onto which snugly fits a bearing cup or cap 28. The worm generally defines a driven gear and is axially aligned with and integrally connected to a crank-receiving member 30 (FIG. 1), preferably taking the form of a tubular hub having a pair of diametrically opposed slots 32 (FIGS. 3 & 4) and an internally splined sleeve 34 (FIG. 1) which communicates with the internal chamber 24 of the worm 22.

A manual drive member, such as a hand crank 36 (FIG. 1) having an externally splined portion 38 and driving head 40, is provided for insertion into the internally splined sleeve 34 of the hub 30 to meshingly engage and manually drive the hub 30. Because the hub is operatively coupled to the gear-like member or worm 22, the hub 30 and worm 22 will rotate simultaneously and together when driven so that rotation of the hub 30 will cause the same corresponding rotation of the gear-like member or worm 22. Preferably, a housing 42 is provided to house the hub 30 and other parts of the gear train 14.

A gear 44, such as a reduction gear, is coaxially and concentrically aligned with and rotatably disposed about the hub 30 and shares a common axis of rotation 46 along with the worm 22. The gear 44 generally defines a power-driven drive gear which is connected to an electric motor 12 or other power source via a pinion 48 to automatically and mechanically drive the hub 30.

In order to releasably couple the hub 30 to the drive gear 44, a disconnecting assembly 50 is provided with a coupling member 52, which preferably takes the form of an elongated locking pin or bar which engages and slidably fits within the slots 32 of the hub 30 and in a pair of diametrically opposed channels or recesses 54 (FIGS. 2 and 4) formed in the upper surface of the drive gear 44. Desirably, the channels 54 are arcuately shaped to snugly receive the locking pin 52 and are aligned with the slots 32 of the hub 30.

The disconnecting assembly 50 further includes a biasing member 56, such as a compression spring. Preferably, the biasing member 56 is positioned within the internal chamber 24 of the worm 22 and is seated upon a lower face plate or engagement plate 58 (FIG. 1) that sits upon the locking pin 52. Normally, the locking pin 52 sits upon and engages the channel 54 and the lower bearing surfaces of the slots 32 and is urged by the spring 56 into locking engagement with the drive gear 44 when the gear train 14 is being driven by the motor 12 as best shown in FIG. 1, so as to releasably lock the hub 30 and drive gear 44 together. When the gear train 14 is being driven by a motor 12, the hub 30 and worm 22 will rotate together at the same angular speed of rotation about the common axis of rotation 46.

Figure 2:
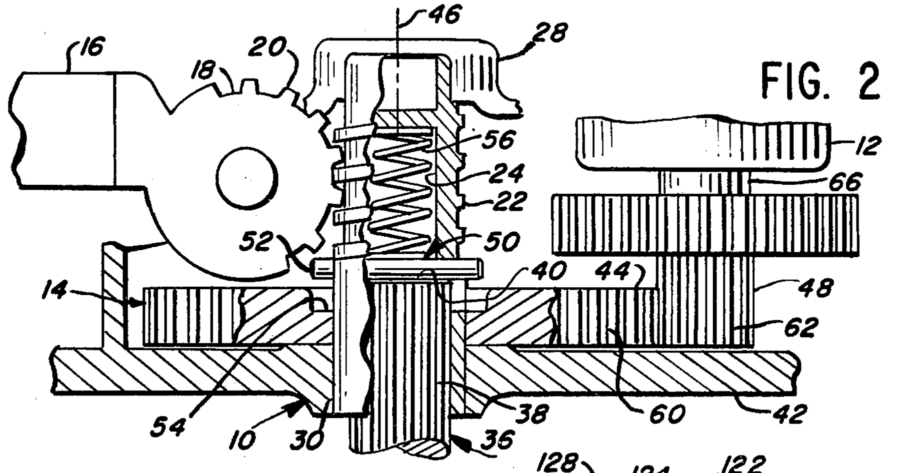
FIG. 2 is a view similar to FIG. 1, but depicting the opening mechanism being manually driven by a hand crank.

In case of a power failure or when otherwise desired, the hub 30 can be manually driven by the hand crank 36. This is accomplished by manually inserting the externally splined portion 38 and driving head 40 of the hand crank 36 into the internally splined sleeve 34 of the hub 30 as shown in FIG. 2 so that the externally splined portion 38 of the hand crank 36 meshingly engages and drives the internally splined sleeve 34 of the hub 30. The hand crank 36 can then be rotated by simply manually rotating the handle of the hand crank 36. When operated in this manner, the driving head 40 of the hand crank 36 will engage and push against the underside of the locking pin 52 to push against and lift the locking pin 52 above and out of locking engagement with the drive gear 44 and into engagement with the upper bearing surfaces of the slots 32 so as to disconnect and unlock the locking pin 52 from the drive gear 44 to permit the hub 30 and worm to rotate independently and free of the drive gear 44. Thus, the disconnecting assembly 50 substantially prevents the hand crank 36 from directly or indirectly driving and exerting torque on the drive gear 44, pinion 48 and motor 12 when the crank is manually driving the hub 30 and worm 22.

In the preferred embodiment, both the drive gear 44 and the pinion 48 are spur gears with the drive gear 44 being a reduction gear. Desirably, the drive gear 44 is substantially larger in size (i.e., it has a greater pitch diameter) and has a substantially greater number of gear teeth 60 than the size and number of gear teeth 62 of the pinion 48 so that the drive gear 44 rotates substantially slower than the pinion 62.

Preferably, the drive gear 44 and pinion 48 are made of metal, such as cast iron, steel or bronze. When it is desired that the gears 44 and 48 mesh relatively quietly, however, such as when the window opener 10 is being used in a hospital, the gears 44 and 48 can be made out of impact-resistant plastic, such as nylon, or a homopolymer acetal resin of the type commonly sold under the trade name of Delrin or some other material.

In some circumstances it may be desirable that an auxiliary power gear 64 be attached to the pinion 48 along a common shaft 66. In other circumstances, it may be desirable that other gears drive the auxiliary gear 64 and pinion 48 from a motor mounted on a different shaft, in lieu of the illustrative arrangement.

In some circumstances it may also be desirable that the reduction gear 44 and pinion 48 are helical gears, herringbone gears, or beveled gears. It may further be desirable that the pitch diameter or number of teeth on the drive gear 44 be less than the pinion 48 such as when the gear train 14 is being used in environments other than industrial window openers, so that the drive gear 44 is smaller than the pinion 48 and will rotate faster than pinion 48.

Figure 5:
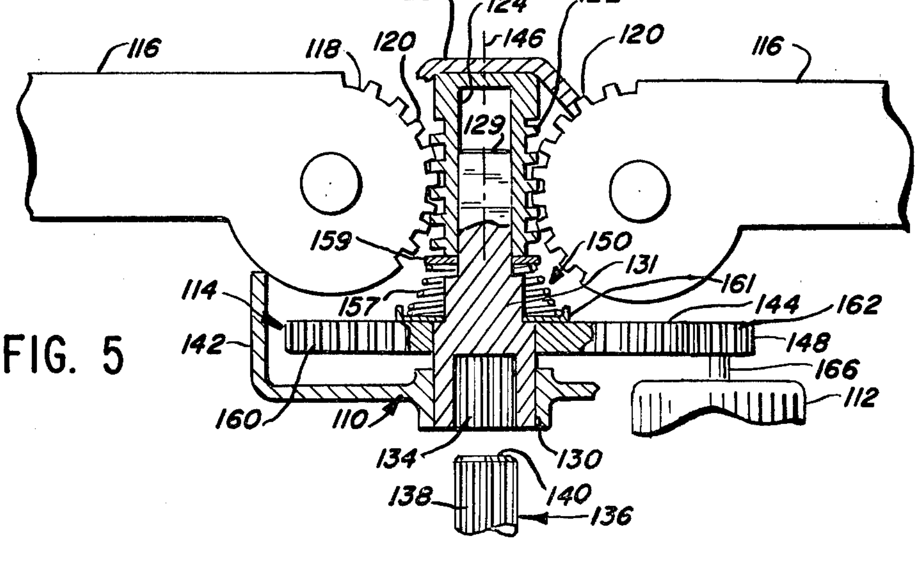
FIG. 5 (on the same page as FIG. 1) is a fragmentary front view of another embodiment of an opening mechanism being driven by a motor for use in an industrial window opener in accordance with principles of the present invention and illustrating parts broken away for ease of understanding and clarity.
Figure 3:
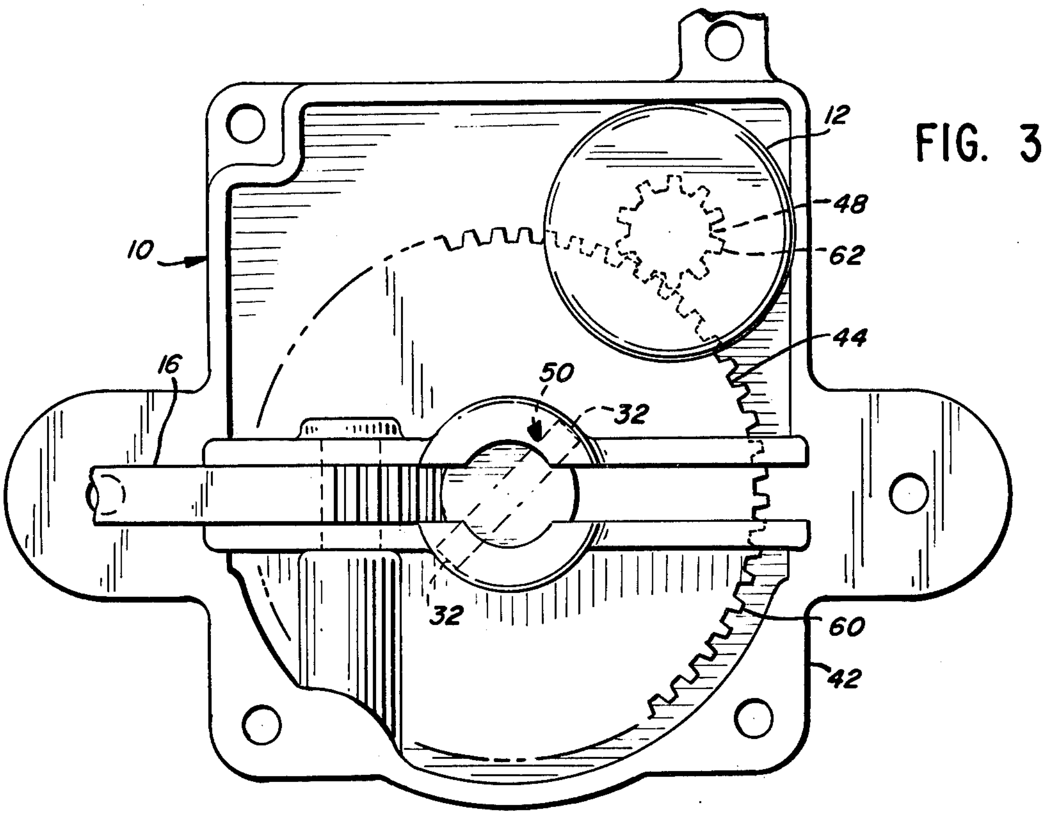
FIG. 3 is a fragmentary top plan view of the opening mechanism.
Figure 4:
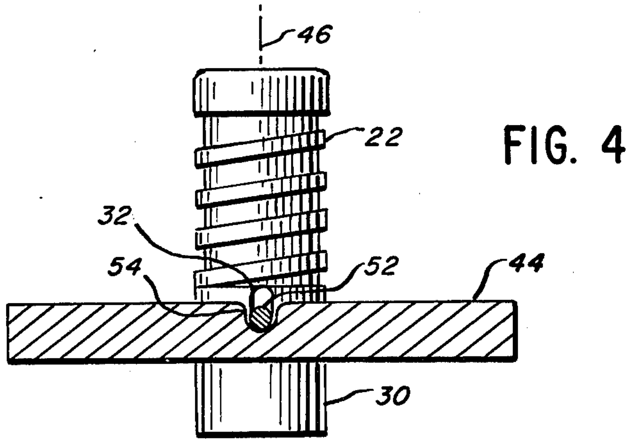
FIG. 4 is a fragmentary side view of portions of the opening mechanism.
Figure 6:
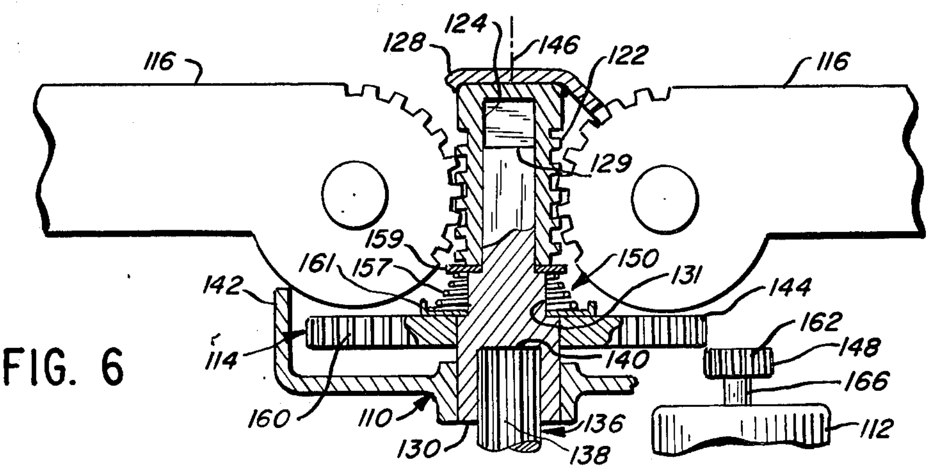
FIG. 6 (on the same page as FIG. 3) is a view similar to FIG. 5, but showing the opening mechanism being manually driven by a hand crank.

Referring now to the embodiment shown in FIGS. 5 and 6 of the drawings, a power opener or actuator with manual override 110 is particularly in an industrial window opener, an automobile window opener, a vehicle roof vent opener and for operating other devices. The power opener or opening mechanism 110 is driven by a power source 112, such as an electric motor or engine and has a gear train or clutch 114 which preferably defines a gear reduction assembly that is similar in many respects to the gear train 14 shown in FIGS. 1–4. For ease of understanding and for clarity, similar parts of gear train 114 in FIGS. 5 and 6 have been given numbers similar to the parts of gear train 14 illustrated in FIGS. 1–4, but in the 100 series, such as worm 122, hub 130, etc.

Preferably, the power opener 110 shown in FIGS. 5 and 6 has two opening levers 116, such as window pivoting levers, to increase the mechanical advantage and leverage of the opener 110. Each of the opening levers 116 has an engaging portion 118 which partly defines a worm gear 120.

A gear-like member 122, such as a worm, meshingly engages the worm gears 120 to drive the levers 116. The worm 122 has an internal chamber 124, which is preferably square in cross-sectional area, to slidably and reciprocally receive a drive shaft 129 that is axially aligned with and integrally connected to a crank-receiving member or hub 130. Desirably, the drive shaft 129 has a square cross-sectional configuration for matingly and interlockingly engaging and driving the worm 122. The drive shaft 129 is preferably elongated and has its lower end integrally connected to an intermediate spring-carrying section 131. As shown in FIG. 5, the intermediate spring-carrying section 131 is integrally connected to and is positioned intermediate and between the hub 130 and the square drive shaft 129. Preferably, the outside diameter of the intermediate spring-carrying section 131 is smaller than the outside diameter of the hub 130, but is larger than the maximum width of the drive shaft 129.

A power-driven gear 144, preferably taking the form of a reduction gear, is axially and concentrically aligned with as well as fixedly connected to the hub 130 so that the driven gear 144, hub 130, drive shaft 129 and worm 122 all rotate together at the same rate of rotation or angular speed about a common axis of rotation 146. The driven gear 144 is meshingly engaged and driven by a power-driven drive gear 148, such as a pinion, which is connected to an electric motor 112 or power source.

In the illustrative embodiment the gear teeth 160 and pitch diameter of the driven gear 144 are substantially greater than the number of gear teeth 162 and pitch diameter of the drive gear 148 so that the reduction gear 144 rotates substantially slower than the drive gear 148. In some circumstances, such as when the gear train 114 is being used in environments or applications other than an industrial window opener 110, it may be useful that the drive gear 148 has a greater number of teeth and a larger pitch diameter than the driven gear 144 so that the driven gear 144 rotates faster than the drive gear 148.

In the gear train 114 of the power opener 110 of FIGS. 5 and 6, the disconnecting assembly 150 preferably takes the form of a helical coil spring 157 which is carried by the intermediate spring-carrying section 131. Spring 157 normally urges the driven gear 144 into meshing engagement with the pinion 148 when the opener 110 is being driven by a motor 112 as shown in FIG. 5. The upper end of the spring 157 abuts against an annular upper face plate or disc 159, which is fixedly connected to the shoulder formed by the junction of the intermediate spring-carrying section 131 and the drive shaft 129, while the lower end of the spring 157 abuts against an annular lower face plate or disc 161, which is seated upon the top surface of the driven gear 144 and hub 130 as well as against the shoulder formed by the junction of the hub and intermediate spring-carrying section 131.

When the gear train 114 is being driven by a motor 112 or other power source as shown in FIG. 5, the pinion 148 will meshingly engage and drive the driven gear 144 so as to cause the square drive shaft 129 to drive the worm 130 which in turn drives the window-pivoting levers 116.

In the event of a power shortage or when otherwise desired, the gear train can be manually driven by the hand crank 136. This is accomplished by inserting the externally splined portion 138 and driving head 140 of the hand crank 136 into the internally splined sleeve 134 of the crank-receiving member or hub 130 and pushing the crank upwardly to overcome the biasing force exerted by the spring 157 so that the driving head 140 of the hand crank 136 lifts and moves the driven gear 144 above and out of meshing engagement with the pinion 148 as best shown in FIG. 6 while simultaneously causing the drive shaft 129 to move upwardly in the internal chamber 124 of the worm 122 until the upper face plate 159 engages the bottom shoulder of the worm 130. The hand crank 136 can then be rotated by simply rotating the handle of the hand crank 136. Thus, the disconnecting assembly 150 substantially prevents the hand crank 136 from directly or indirectly driving or exerting torque on the drive gear 148 and motor 112.

Figure 7:
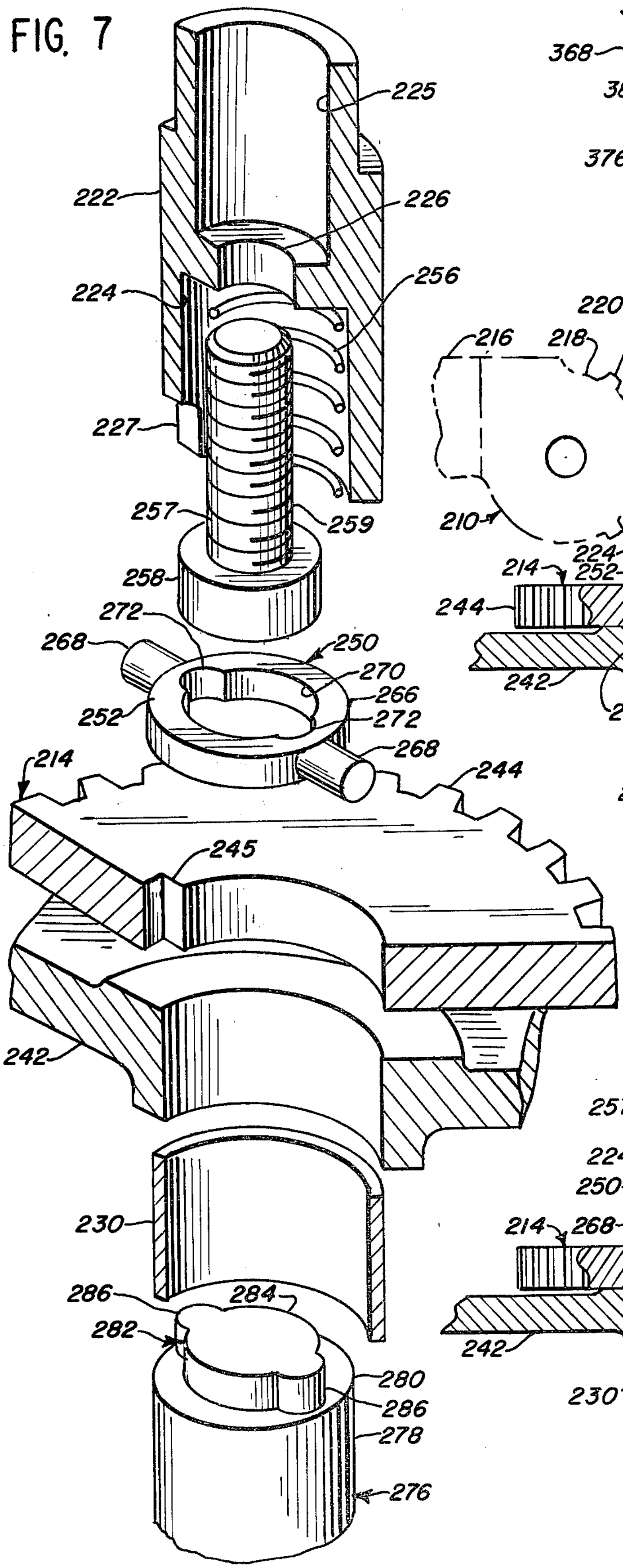
FIG. 7 is an enlarged exploded fragmentary view of a further embodiment of an opening mechanism in accordance with principles of the present invention.
Figure 8:
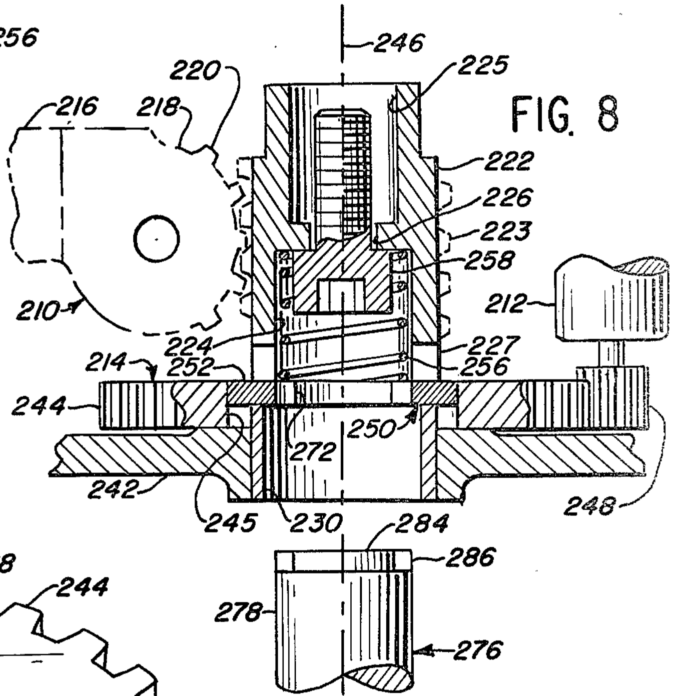
FIG. 8 is a fragmentary front view of the opening mechanism of FIG. 7 being driven by a motor and showing in phantom or dotted line a window-pivoting lever and a worm for use in an industrial window opener.
Figure 9:
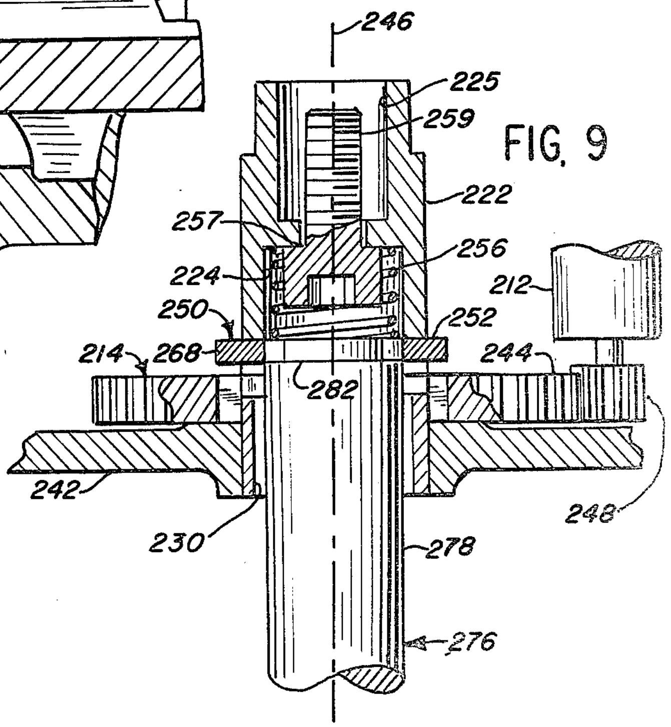
FIG. 9 is a view similar to FIG. 8, but depicting the opening mechanism being manually driven by a hand crank.

Referring now to the embodiment shown in FIGS. 7-9 of the drawings, a power opener or actuator with manual override 210 is particularly useful in an industrial window opener, an automobile window opener, a vehicle roof vent opener, for operating other devices and for driving a variety of loads. The opener or opening mechanism 210 is powered by a power source 212, such as an electric motor or engine and has a gear train or clutch 214 which defines a gear reduction assembly that is similar in many respects to the gear train 14 shown in FIGS. 1-4.

As best shown in phantom or dotted line in FIG. 8, power opener 210 has a lever 216, such as a window-pivoting lever, that is constructed and arranged with an engaging portion 218 which partly defines a worm gear 220. A driven member 222, which preferably takes the form of a gear-like member such as a worm 223 as shown in phantom or dotted line in FIG. 8, meshingly engages the worm gear 220 to drive the lever 216.

Worm 223 has a lower internal spring-receiving cylindrical chamber or cavity 224 in communication with an upper internal shank-receiving chamber or cavity 225. An intermediate bolt-receiving aperture or opening 226 connects the lower spring-receiving chamber 224 to the upper shank-receiving chamber 225. Desirably, the bottommost portion of the driven member 222 defines a pair of diametrically opposed spanner arm-receiving slots 227.

A power-driven drive gear 224, preferably taking the form of a reduction gear, is axially and concentrically aligned with the driven member 222. Desirably, drive gear 224 defines a pair of diametrically opposed spanner arm-receiving slots 245. In the illustrative embodiment drive gear 244 is connected to electric motor 212 via a pinion 248 to automatically and mechanically drive the driven member 222 about a common axis of rotation 246 with the drive gear 244.

In order to releasably couple the driven member 222 to the drive gear 244, a disconnecting assembly 250 is provided with a coupling member which preferably takes the form of a spanner 252. The disconnecting assembly 250 further includes a biasing member 256, such as a compression spring, which is mounted in the spring-receiving chamber 224 of the driven member 222 by means of a bolt 257 or other fastener. In the illustrative embodiment the head 258 of the bolt 257 is located within the lower spring-receiving chamber 224 and engages and bears against the top wall of the spring-receiving chamber and the shank 259 of the bolt 257 extends into the upper shank-receiving chamber 225.

As best shown in FIG. 7, the spanner 252 has an annular body 266 from which extends at least one, and preferably a pair of diametrically opposed pin-like spanner arms 268. Arms 268 extend outwardly of the driven member 222 to engage the walls forming the arm-receiving slots 245 and 227 of the drive gear 244 and the driven member 222, respectively. Preferably, the spanner's annular body 266 has an internal wall 270 which defines a driving head-receiving opening. In the embodiment of FIG. 7, the spanner also has a pair of diametrically opposed concave walls 272 which define semicircular locking ear-receiving openings.

Desirably, drive gear 244 is seated upon and rotates on the upper bearing surface of a housing 242. In the illustrative embodiment a crank-receiving hub or sleeve 230 is press-fit or otherwise fixed to housing 242 during assembly after the spanner arms 268 have been inserted in the drive gear slots 245.

In order to manually drive the driven member 222, a manual drive member, such as a hand crank 276, is provided. Hand crank 276 preferably has an elongated engageable cylindrical body or foot 278 (FIG. 7) with a shoulder 280 which is adapted to bear against the underside of the spanner 252. A driving head 282 extends outwardly from the shoulder in general axial alignment with the cylindrical foot 278.

In the embodiment shown in FIG. 7, driving head 282 has a cylindrical body or head portion 284 that is adapted to matingly engage the internal wall 270 forming the driving head-receiving opening 270. Driving head 282 also has a pair of diametrically opposed locking ears 286 that extend outwardly from the cylindrical body portion 284. In the illustrative embodiment, each of the locking ears 286 has a semicircular shape or configuration for mating interlocking engagement with the concave walls 272 forming the locking ear-receiving openings of the spanner 252.

In the event of a power shortage or when it is otherwise desired to manually drive the driven member 222, hand crank 276 is inserted into the hub 230 as shown in FIG. 9, until the locking ears 286 and cylindrical head portion 284 are seated in the spanner openings 272 and 270, respectively, and the shoulder 280 bears against and engages the underside of the spanner 252. The hand crank 276 is then moved upward so that the shoulder 280 lifts and drives the spanner 252 above and out of locking engagement with the drive gear and into engagement with the upper bearing surfaces of the slots 227 of the driven member 222. When operated in this manner, hand crank 276 will disconnect and unlock the spanner 252 from the drive gear 244 so that the driven member 222 and spanner 252 can rotate together, free of the drive gear 244, when the hand crank 276 is rotated without directly or indirectly driving and exerting torque on the drive gear 244, pinion 248 and motor 212.

When the driven member 222 is being mechanically driven by motor 212, as shown in FIG. 8, spring 256 bears against the upper surface of the annular body 266 of the spanner 252 to urge the spanner arms 268 into mating locking engagement with drive gear slots 245.

Figure 10:
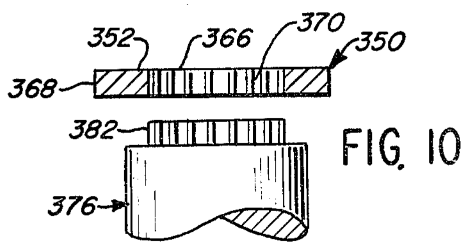
FIG. 10 is a fragmentary side view of a spanner and hand crank of another embodiment in accordance with principles of the present invention.

In some circumstances it may be desired that the annular body 366 of the spanner 352 be constructed and arranged to define an internally splined wall 370 (FIG. 10) about the driving head-receiving opening to meshingly engage and be driven by an externally splined driving head 382. Because of the interlocking meshing engagement of the splined surfaces of the driving head 382 and spanner 352, the hand crank 376 of the embodiment shown in FIG. 10 need not have locking ears 286 and the spanner 352 similarly need not have concave walls 272 defining locking ear-receiving openings as shown in FIG. 7.

Although embodiments of this invention have been shown and described, it is to be understood that various modifications and substitutions can be made by those skilled in the art without departing from the novel spirit and scope of this invention.

What is desired to be protected and secured by Letters Patent of the United States is:

1. A mechanism with manual override, comprising:
power-driven drive gear means;
driven means including a worm operatively driven by said power-driven drive gear means about an axis of rotation, said worm defining an internal disconnecting means-receiving chamber, and an output lever partly defining a worm gear spaced from said axis of rotation and driven by said worm;

a hub defining a crank-receiving socket coaxially aligned with said internal disconnecting means-receiving chamber along said axis of rotation;

manual drive means including a hand crank engageable in said socket for manually driving said driven means; and disconnecting means at least partly positioned in said internal disconnecting means-receiving chamber and responsive to engagement of said manual drive means with said driven means for disconnecting said driven means from said power-driven drive gear means.

2. A mechanism with manual override in accordance with claim 1 wherein:

said power-driven drive gear means include a reduction gear concentrically positioned about said hub and a pinion for driving said reduction gear, said reduction gear defining a pair of diametrically opposed locking pin-receiving channels;

said hub is tubular and defines a pair of diametrically opposed locking pin-receiving slots aligned in registration with said locking pin-receiving channels when said driven means are being driven by said power-driven drive gear means;

said socket includes an internally splined sleeve;

said disconnecting means include a locking pin normally seated in said locking pin-receiving slots and channels for releasably coupling said power-driven drive gear means to said driven means and include biasing means positioned in said disconnecting means-receiving chamber for urging said locking pin into locking engagement with said power-driven drive gear means; and said manual drive means has an externally splined portion for meshingly engaging and driving said internally splined sleeve and has a driving head for engaging and disconnecting said locking pin from said locking pin-receiving channels of said reduction gear when said manual drive means engages and drives said driven means.

3. A mechanism in accordance with claim 1 wherein:

said power-driven drive gear means include a reduction gear concentrically positioned about said hub, and a pinion for driving said reduction gear, said reduction gear defining a first pair of diametrically opposed spanner arm-receiving slots;

said hub is fixed relative to said power-driven drive gear means and said driven means;

said worm defining a second pair of diametrically opposed spanner arm-receiving slots aligned in registration with said first pair of spanner arm-receiving slots when said driven means are being driven by said power-driven drive gear means;

said disconnecting a spanner having an annular body defining driving head-receiving means and having a pair of diametrically opposed pin-like spanner-arms, extending outwardly from said annular body normally seated in said first and second spanner arm-receiving slots for releasably coupling said power-driven drive gear means to said driven means, and said disconnecting means include biasing means positioned in said disconnecting means-receiving chamber for urging said spanner arms into locking engagement with said reduction gear; and said manual drive means has a shoulder and a driving head for engaging said annular body and disconnecting said spanner arms from said first pair of spanner arm-receiving slots of said reduction gear when said manual drive means engages and drives said driven means.

4. A mechanism with manual override in accordance with claim 3 wherein:

said driving head of said manual drive means has a cylindrical body portion and a pair of diametrically opposed locking ears extending outwardly from said cylindrical body portion, and said driving head-receiving means of said spanner include a cylindrical body portion-receiving opening and a pair of diametrically opposed locking ear-receiving openings.

5. A mechanism with manual override in accordance with claim 3 wherein:

said driving head of said manual drive means includes an externally splined driving head, and said driving head-receiving means of said spanner includes an internally splined wall for meshingly engaging and being driven by said externally splined driving head.

6. A mechanism with manual override in accordance with claim 1 wherein:

said power-driven drive means includes a pinion; and said driven means further include a driven reduction gear concentrically positioned about and in coaxially and fixed relationship with said hub for meshingly engaging and being driven by said power-driven drive gear means;

said disconnecting means includes an elongated drive shaft axially aligned with said hub and slidably positioned in said disconnecting means-receiving chamber of said worm for driving said worm, an intermediate spring-carrying shaft section extending between and integrally connecting said drive shaft and said hub, and spring means carried by said intermediate spring-carrying section for urging said reduction gear into engagement with said power-driven drive means;

said socket of said hub includes an internally splined wall; and said manual drive means has an externally splined portion for meshingly engaging and driving said internally splined wall and has a driving head for disconnecting said driven means from said power-driven drive gear means.

7. A mechanism with manual override in accordance with claim 6 wherein:

said elongated drive shaft has a square cross-sectional configuration, and said internal disconnecting means-receiving chamber of said worm has a square cross-sectional area for mating interlocking engagement with said elongated drive shaft.

8. A mechanism with a manual override, comprising:

a lever having an engaging portion partly defining a worm gear;

a worm for meshingly engaging and driving said worm gear portion of said lever and defining an internal chamber;

crank-receiving means axially aligned with and coupled to said worm for unitary rotation therewith;

a reduction gear for driving said crank-receiving means along a common axis of rotation;

a power-driven pinion for meshingly engaging and driving said reduction gear;

power source means operatively connected to said power-driven pinion for driving said power-driven pinion;

a hand crank for engaging and manually driving said crank-receiving means; and releasable coupling means operatively associated with said crank-receiving means for releasably effecting an operative interconnection between said crank-receiving means and said power-driven pinion, said releasable coupling means being responsive to engagement of said hand crank with said crank-receiving means for disconnecting said crank-receiving means from said power-driven pinion.

9. A mechanism with manual override in accordance with claim 8 wherein:

said crank-receiving means and said worm are a unitary structure defining at least one slot passing therethrough;

said releasable coupling means include a locking pin for releasably coupling said crank-receiving means to said reduction gear and spring means disposed in said internal chamber for urging said coupling means into locking engagement with said reduction gear; and said hand crank includes a driving head for engaging and displacing said locking pin from said reduction gear when said hand crank engages and drives said crank-receiving means to disconnect said crank-receiving means from said power-driven pinion.

10. A mechanism with manual override in accordance with claim 8 wherein:

said crank-receiving means is connected to said reduction gear and includes an intermediate spring-carrying shaft section and an elongated drive shaft for reciprocally sliding in said internal chamber and driving said worm;

said releasable coupling means include spring means carried by said intermediate spring-carrying shaft section for urging said reduction gear in meshing engagement with said pinion to effect said operative interconnection between said crank-receiving means and said power-driven pinion; and said hand crank includes a driving head for driving and moving said reduction gear out of engagement with said pinion.

11. A mechanism with manual override, comprising:

a power-driven drive gear defining a pair of diametrically opposed locking pin-receiving channels;

crank-receiving means in coaxial relationship with said power-driven drive gear, said crank-receiving means having an internally splined sleeve and defining at least one slot;

a worm coaxially connected to said crank-receiving means and defining a spring-receiving chamber;

a lever having an engaging portion partly defining a worm gear for meshingly engaging and being driven by said worm;

a locking pin slidable in said slot for releasably coupling said crank-receiving means to said power-driven drive gear;

spring means disposed in said spring-receiving chamber for urging said locking pin in locking engagement with said power-driven drive gear; and a hand crank having an externally splined portion for meshingly engaging and manually driving said internally splined sleeve and having a driving head for engaging and disconnecting said coupling means from said power-driven drive gear for substantially preventing said hand crank from driving and exerting torque on said power-driven drive gear.

12. A mechanism with manual override in accordance with claim 11, further including:

a power source, and a pinion operatively connected to said power source for driving said power-driven drive gear.

13. A mechanism with manual override in accordance with claim 12, wherein the number of teeth on said power-driven drive gear exceeds the number of teeth on said pinion so that said power-driven drive gear rotates substantially slower than said pinion.

14. A mechanism with manual override, comprising:

a power-driven drive gear;

a driven gear for removably meshingly engaging and being driven by said power-driven drive gear;

crank-receiving means including a hub coaxially aligned with and connected to said driven gear and having an internally splined sleeve;

a driver including an elongated drive shaft axially aligned with said hub;

an intermediate spring-carrying shaft section extending between and integrally connecting said driver and said hub;

a worm defining an internal elongated chamber for slidably receiving and being driven by said drive shaft;

at least one lever having an engaging portion partly defining a worm gear for meshingly engaging and being driven by said worm;

spring means carried by said intermediate spring-carrying shaft section for urging said driven gear in meshing engagement with said power-driven drive gear; and a hand crank having an externally splined portion for meshingly engaging and manually driving said internally splined sleeve and having a driving head for driving and moving said driven gear out of engagement with said power-driven drive gear for substantially preventing said power-driven drive gear from being driven by said driven gear when said hand crank is driving said internally splined sleeve.

15. A mechanism with manual override in accordance with claim 14 wherein said power-driven drive gear includes a pinion.

16. A mechanism with manual override in accordance with claim 14 wherein:

said drive shaft has a square cross-sectional configuration; and said internal elongated chamber of said worm has a square cross-sectional area for mating interlocking engagement with said drive shaft.

17. A mechanism with manual override in accordance with claim 14 including a pair of window-pivoting levers for meshingly engaging and being driven by said worm to increase the mechanical advantage and leverage of said mechanism.

18. A mechanism with manual override, comprising:

a power-driven drive gear defining a first pair of diametrically opposed spanner arm-receiving slots;

fixed crank-receiving means in axial alignment with said power-driven drive gear;

a worm in axial alignment with both said crank-receiving means and said power-driven drive gear, said worm defining a spring-receiving chamber and a second pair of diametrically opposed spanner arm-receiving slots;

a lever having an engaging portion partly defining a worm gear for meshingly engaging and being driven by said worm;

a spanner having an annular body defining driving head-receiving means and having a pair of diametrically opposed spanner arms extending outwardly of said annular body for engaging said first and second pairs of spanner arm-receiving slots to releasably couple said worm to said power-driven drive gear;

spring means disposed in said spring-receiving chamber for urging said spanner in locking engagement with said power-driven drive gear; and a hand crank having a shoulder and driving head engageable in said driving head-receiving means for engaging and disconnecting said spanner from said power-driven drive gear to substantially prevent said hand crank from driving and exerting torque on said power-driven drive gear.

19. A mechanism with manual override in accordance with claim 18 wherein said:

driving head has a cylindrical body portion and a pair of diametrically opposed locking ears extending outwardly from said cylindrical body portion.

20. A mechanism with manual override in accordance with claim 19 wherein:

each of said locking ears has a semi-circular configuration, and said driving head-receiving means has concave walls for mating interlocking engagement with said locking ears.

21. A mechanism with manual override in accordance with claim 18 wherein:

said hand crank has an externally splined driving head, and said annular body of said spanner has an internally splined wall for meshingly engaging and being driven by said externally splined driving head.

22. A mechanism with manual override, comprising:

a power-driven drive gear defining a pair of diametrically opposed locking pin-receiving channels;

crank-receiving means in coaxial relationship with said power-driven drive gear, said crank-receiving means having an internally splined sleeve and defining a pair of diametrically opposed locking pin-receiving slots;

a driven member coaxially connected to said crank-receiving means and defining an internal spring-receiving chamber;

a locking pin slidably seated in said locking pin-receiving slots and channels for releasably coupling said crank-receiving means to said power-driven drive gear;

spring means disposed in said spring-receiving chamber for urging said locking pin in locking engagement with said power-driven drive gear; and a hand crank having an externally splined portion for meshingly engaging and manually driving said internally splined sleeve and having a driving head for engaging said disconnecting said coupling means from said power-driven drive gear for substantially preventing said hand crank from driving and exerting torque on said power-driven drive gear.

23. A mechanism with manual override, comprising:

a power-driven drive gear;

a driven reduction gear for removably meshingly engaging and being driven by said power-driven drive gear;

crank-receiving means including a hub coaxially aligned with and connected to said driven reduction gear and having an internally splined sleeve;

a driver including an elongated drive shaft axially aligned with said hub;

an intermediate spring-carrying shaft section extending between and integrally connecting said driver and said hub;

a driven member defining an internal elongated chamber for slidably receiving and being driven by said drive shaft;

spring means carried by said intermediate spring-carrying shaft section for urging said driven reduction gear in meshing engagement with said power-driven drive gear; and a hand crank having an externally splined portion for meshingly engaging and manually driving said internally splined sleeve and having a driving head for driving and moving said driven gear out of engagement with said power-driven drive gear for substantially preventing said power-driven drive gear from being driven by said driven gear when said hand crank is driving said internally splined sleeve.

24. A mechanism with manual override, comprising:

a power-driven drive gear defining a first pair of diametrically opposed spanner arm-receiving slots;

fixed crank-receiving means in axial alignment with said power-driven drive gear;

a driven member in axial alignment with both said crank-receiving means and said power-driven drive gear, said driven member defining a spring-receiving chamber and a second pair of diametrically opposed spanner arm-receiving slots;

a spanner having an annular body defining driving head-receiving means and having a pair of diametrically opposed spanner arms extending outwardly of said annular body for engaging said first and second pairs of spanner arm-receiving slots to releasably couple said driven member to said power-driven drive gear;

spring means disposed in said spring-receiving chamber for urging said spanner in locking engagement with said power-driven drive gear; and a hand crank having a shoulder and driving head engageable in said driving head-receiving means for engaging and disconnecting said spanner from said power-driven drive gear to substantially prevent said hand crank from driving and exerting torque on said power-driven drive gear.

* * * * *

UNITED STATES PATENT AND TRADEMARK OFFICE

CERTIFICATE OF CORRECTION

PATENT NO. : 4,137,796

DATED : February 6, 1979

INVENTOR(S) : Harry H. Bostrom

It is certified that error appears in the above-identified patent and that said Letters Patent are hereby corrected as shown below:

Column 9, line 57, after "disconnecting" insert --means include--.

Column 14, line 2, "said" (first occurrence) should be --and--.

Signed and Sealed this

*Fifth* Day of *June 1979*

[SEAL]

*Attest:*

RUTH C. MASON
*Attesting Officer*

DONALD W. BANNER
*Commissioner of Patents and Trademarks*